US011875417B1

(12) United States Patent
Gunther

(10) Patent No.: US 11,875,417 B1
(45) Date of Patent: Jan. 16, 2024

(54) SOCIAL NETWORK SYSTEM AND METHOD OF USE

(71) Applicant: Dawn Gunther, Houston, TX (US)

(72) Inventor: Dawn Gunther, Houston, TX (US)

( * ) Notice: Subject to any disclaimer, the term of this patent is extended or adjusted under 35 U.S.C. 154(b) by 172 days.

(21) Appl. No.: 15/859,414

(22) Filed: Dec. 30, 2017

Related U.S. Application Data

(60) Provisional application No. 62/440,896, filed on Dec. 30, 2016.

(51) Int. Cl.
*G06F 3/048* (2013.01)
*G06Q 50/00* (2012.01)
*G06Q 50/18* (2012.01)
*H04L 67/306* (2022.01)
*H04L 51/52* (2022.01)
*H04L 51/224* (2022.01)

(52) U.S. Cl.
CPC .......... *G06Q 50/01* (2013.01); *G06Q 50/186* (2013.01); *H04L 51/224* (2022.05); *H04L 51/52* (2022.05); *H04L 67/306* (2013.01)

(58) Field of Classification Search
None
See application file for complete search history.

(56) References Cited

U.S. PATENT DOCUMENTS

| | | | | |
|---|---|---|---|---|
| 2002/0072925 A1* | 6/2002 | Krim | ...................... | G06Q 10/10 709/206 |
| 2013/0080532 A1* | 3/2013 | Stewart | .................. | G06Q 50/01 709/204 |
| 2013/0297710 A1* | 11/2013 | Luber | ...................... | H04L 51/00 709/206 |
| 2014/0136996 A1* | 5/2014 | Boozer | .................. | G06Q 10/00 715/753 |
| 2014/0337059 A1* | 11/2014 | Simon | ...................... | G06Q 50/01 705/4 |
| 2015/0101026 A1* | 4/2015 | Kraus | ...................... | H04W 4/21 726/4 |

OTHER PUBLICATIONS

Cllison-Burch, Vannessa, Adding a Legacy Contact, Feb. 12, 2015, https://about.fb.com/news/2015/02/adding-a-legacy-contact/ (Year: 2015).*

* cited by examiner

*Primary Examiner* — William C Trapanese
(74) *Attorney, Agent, or Firm* — Richard Eldredge; Leavitt and Eldredge Law Firm

(57) ABSTRACT

A social network system includes a wireless server to receive and transmit data; contact portals in communication with the wireless server, the contact portals being associated with persons; a media platform to be accessed via a computing device, the media platform having a contact receiving portal to allow a user of the media platform to grant access to contact information relating to the contact portals, the contact information being one or more of phone numbers, e-mail addresses, and social media accounts, an input portal to receive a health indicator associated with the user; an advocate granting portal wherein the user can select a person as an advocate, thereby granting the advocate permission to send one or more notices to the contact portals; and a notification setting portal where the user can pre-select one or more messages to transmit to a subset of the contact portals; the subset of the contact portals receive one or more messages relating to the health indicator.

12 Claims, 5 Drawing Sheets

SOCIAL NETWORK SYSTEM AND METHOD OF USE

BACKGROUND

1. Field of the Invention

The present invention relates generally to social network systems, and more specifically, to a social network system for providing notifications regarding the death of a person.

2. Description of Related Art

Social network systems are well known in the art and are effective means to interact with other people. For example, FIG. 1 depicts a conventional social network system 101 having at least two users 103, 105 interacting through an online social network 107 via computing devices 109, 111. Each user 103, 105 creates profiles and updates information regarding themselves via social network 107.

One of the problems commonly associated with system 101 is limited information. For example, in the event that a user becomes incapacitated, via death, illness, or injury, the user's social network acquaintances will likely not receive any notification of such an event.

Further, when notified of the death via the current social media network, there generally is not a structure wherein a party can provide condolences, make a monetary gift, receive funeral information, obituaries, and the like.

Accordingly, although great strides have been made in the area of social network systems and methods of use, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
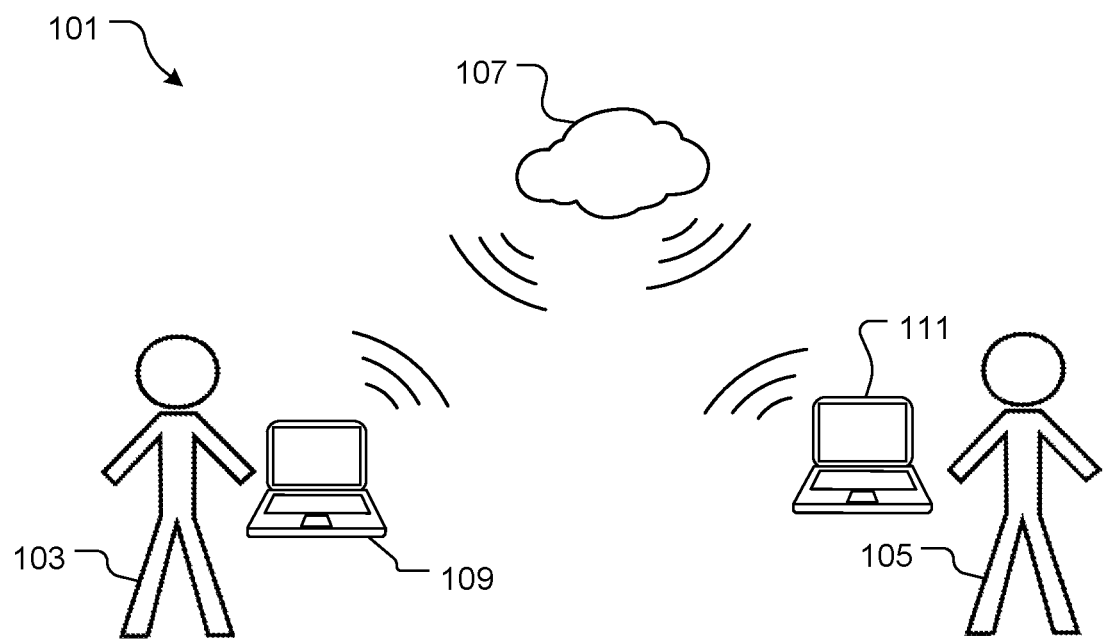
FIG. 1 is a simplified schematic of a common social network system.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional social networking systems. Specifically, the present invention provides a means to alert social network users of the incapacitation of other users. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Figure 2:
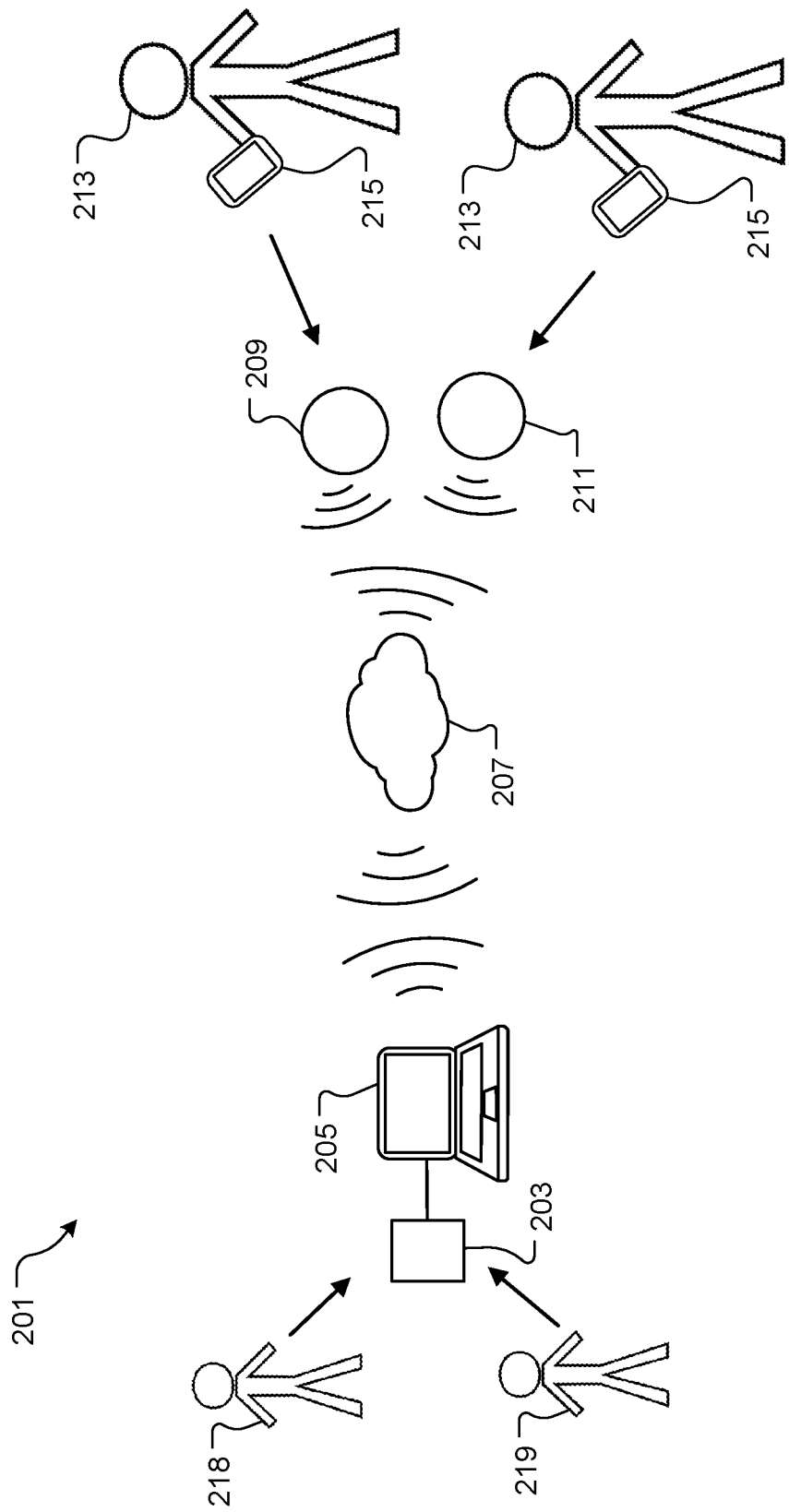
FIG. 2 is a simplified schematic of a social network system in accordance with a preferred embodiment of the present application.

Referring now to the drawings wherein like reference characters identify corresponding or similar elements throughout the several views, FIG. 2 depicts a schematic view of a social network system 201 in accordance with a preferred embodiment of the present application. It will be appreciated that system 201 overcomes one or more of the above-listed problems commonly associated with conventional social network systems.

In the contemplated embodiment, system 201 includes media platform 203 accessible via a computing device 205 and in communication with a wireless network 207. Wireless network 207 is configured to transmit information to a plurality of social contact portals 209, 211, such as social media (Facebook, twitter, and Linked In), email, and/or phone numbers. The contact portals are associated with one or more persons 213a-b with computing devices 215a-b. In the preferred embodiment, the contact portals are established via contacts associated with a user 218 of media platform 203, such as through the user's phone contacts, social media connections, and/or email address book. It should be appreciated that media platform 203 is configured to automatically connect to and retrieve said contact information.

In one contemplated embodiment, the system would offer history, photos, videos, and hologram images of the user 218 upon the death of the user. The system is provided with a means as a social media platform where notified parties can post prayers for loved ones, notify parties that are ill, parties in recent accidents, birth, and/or other significant events.

In the present invention, media platform 203 includes a means for user 218 to designate an advocate 219, thereby granting access to advocate 219 to have access to contact information of persons 213a-b (as well as all contacts associated with the user's email, phone, and social media accounts) post messages, send notifications, etc. on behalf of user 218 upon the death or incapacitation of user 218.

Figure 3:
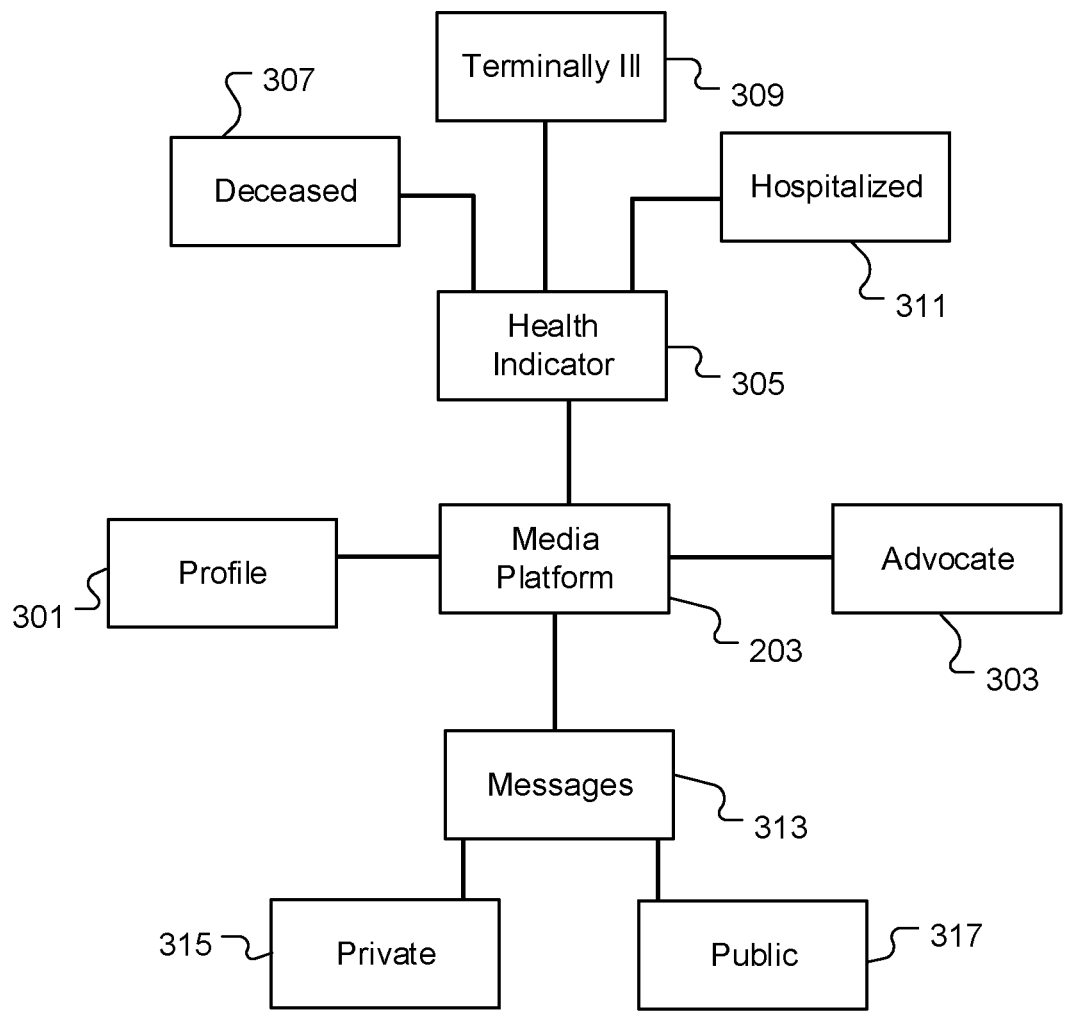
FIG. 3 is a simplified schematic of a media platform of FIG. 2 as associated with a user.

In FIG. 3, a simplified schematic demonstrates media platform 203 from the perspective of user 218. It should be appreciated that the user can create a profile 301, wherein the user can provide access to their plurality of social networks, email accounts, and phone contacts. Platform 203 further includes an advocate selection portal 303 wherein the user can select one or more persons as their advocate, thereby granting said persons access to platform 203. Media platform 203 further includes a health indicator selection portal 305 configured to receive a health status update associated with user 218. It should be appreciated that the health indicator selection portal can be manipulated via the user, or upon the death or incapacitation of the user, can be manipulated by the selected advocate. This provides a means for the user's health, such as being deceased 307, terminally ill 309, or hospitalized 31 can be selected to be transmitted to the plurality of contacts. Further, it is contemplated that this feature provides a means to select one or more of a diagnosis, hospice care, injuries, etc.

Media platform 203 further includes a last message portal 313 wherein the user can pre-select private 315 and public messages 317 to be transmitted to either all (public) or a subset (private) of the plurality of contact portals. It should be understood that the user can either select pre-established messages or create their own, as well as designate the subset of contact portals to receive the private messages. This feature allows for persons who care about the user to receive personalized messages from the user after the user's death. It should be appreciated that the messages can be "last word" messages in the form of text messages, emails, videos, photographs, social media posts, holographic images, or any other form of information to be transmitted to contacts. In addition, it should be understood that the messages can be transmitted automatically or upon a command from the advocate.

Figure 4:
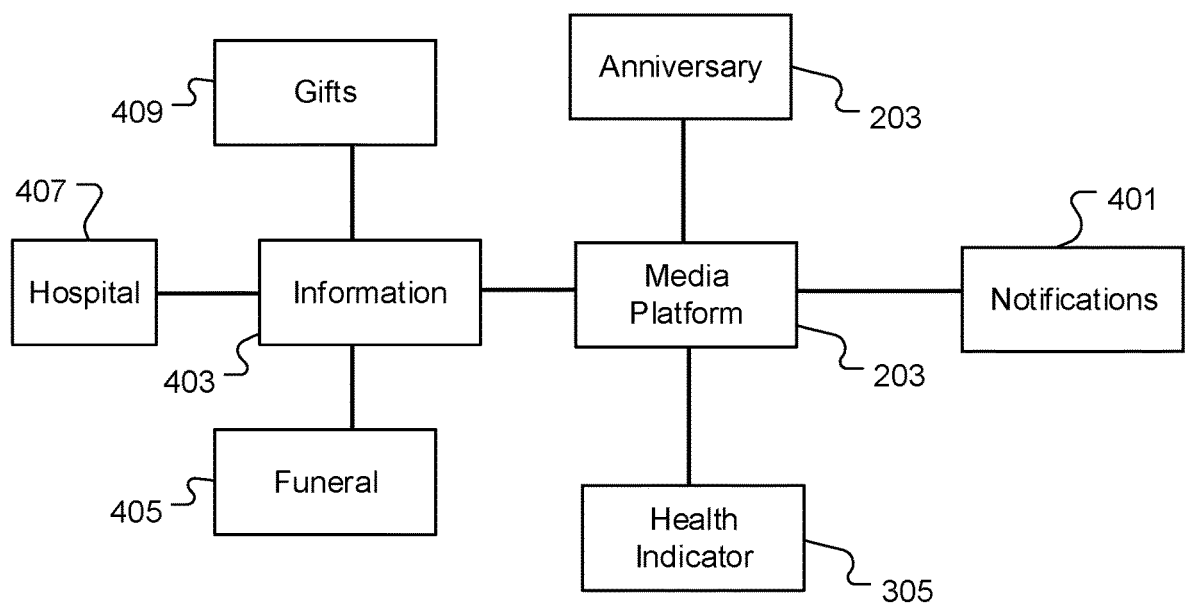
FIG. 4 is a simplified schematic of the media platform of FIG. 2 as associated with an Advocate.

In FIG. 4, a simplified schematic of the media platform 203 from the advocates perspective is shown, wherein the advocate receives access to the health indicator 305 portal, and further has access to send notifications 401 to one or more of the plurality of contact portals. It should be appreciated that the advocate can log into media platform 203 and provide a notice that the user has passed on thereby automatically triggering the transmission of messages as left by the user. Further, the advocate can transmit additional notices, such as funeral information, through the notification portal 401.

The advocate further has access to an information portal 403 wherein the advocate can input information such as time and location of a funeral service 405, obituaries, hospital location 407, gift delivery information 409, and requests or needs that the family needs. Accordingly, it is contemplated having the system in communication with other third party platforms such as "go fund me" and the like. It should be understood that the advocate can designate if the variety of information is merely posted on one or more of the user's social media accounts, or is personally transmitted to all or some of the contacts.

Media platform 203 can further include an anniversary setting portal 411 wherein the advocate can transmit reminders to the one or more contact portals on the anniversary of the user's death.

Figure 5:
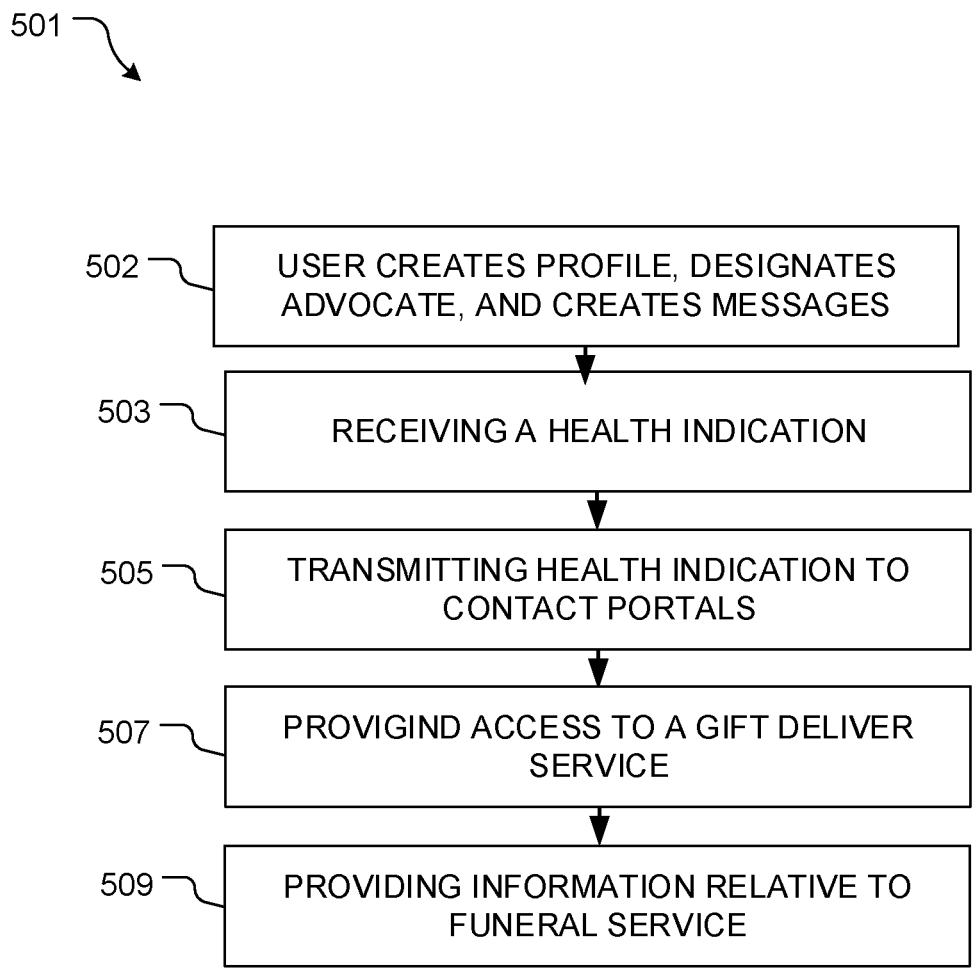
FIG. 5 is a flowchart of the method of FIG. 2.

As shown in FIG. 5, flowchart 501 depicts the method of system 201. The user creates an account, selects an advocate, and pre-establishes one or more messages, the one or more messages either being public or private, as shown with box 502. After the user becomes incapacitated, the advocate 219, which can be anyone selected by the user, such as a family member, friend, or doctor, selects a health indication in the media platform 203 from computing device 205, as shown in box 503. The health indication is transmitted through wireless network 207 to the plurality of contact portals, thereby notifying a plurality of persons of the user's health, as shown with box 505. The advocate can additionally input information relating to a funeral service, obituaries, and gift deliveries into the media platform to be transmitted to the plurality of contacts, as shown with boxes 507, 509.

It should be appreciated that one of the unique features believed characteristic of the present application is media platform 203 allowing the advocate to notify a plurality of persons through social media, email, or phone regarding the death or incapacitation of a person. It should be appreciated that this feature allows social network users to conveniently learn about the passing and/or illnesses of acquaintances. It will also be appreciated that the platform could be sponsored by advertisements such as life insurance, flowers, monuments, and the like.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A social network system, comprising:
   a wireless server configured to receive and transmit data;
   a plurality of contact portals in communication with the wireless server, the plurality of contact portals being associated with a plurality of persons;
   a media platform accessible via a computing device, the media platform having a user profile accessible by a user and accessible by an advocate, the advocate being selected by the user, and the media platform having:
   a contact receiving portal wherein the user of the media platform grants access to contact information relating to the plurality of contact portals, the contact information being one or more of phone numbers, e-mail addresses, and social media accounts;
   an input portal having a health indicator associated with the user as input by the advocate upon incapacitation of the user;
   a memorial page portal within the user's profile manipulated via an advocate through the user profile and upon a death of the user, the memorial page portal being published to one or more of the plurality of contact portals; and
   a gift delivery portal to allow persons of the plurality of contact portals to purchase gifts for user;

an advocate granting portal wherein the user can select a person as the advocate, thereby granting the advocate permission to send one or more notices to the plurality of contact portals; and a notification setting portal wherein the user can pre-select one or more messages to transmit to a subset of the plurality of contact portals, the subset being selected by the user through the user profile prior to the advocate inputting the health indicator of the user as incapacitated, the messages are transmitted upon the advocate inputting the health indicator that the user is incapacitated;

wherein the advocate transmits to a public message to all of the plurality of persons via the notification setting portal; and wherein the plurality of contact portals receives one or more messages relating to the health indicator.

2. The system of claim 1, wherein the health indicator comprises a selection of deceased, terminally ill, hospital care, hospice care, and injury.

3. The system of claim 1, wherein the media platform further comprises:

an information portal configured to be operated via the advocate and configured to send information relating to funeral services, obituary statements, and gift delivery to the plurality of social networks.

4. The system of claim 1, wherein the notification setting portal comprises:

a selection of public last messages, having one or more public messages for selection by the user, a selected public message is transmitted to a II of the plurality of contact portals; and a selection of private last message, having one or more private messages as created by the user, a created private message is transmitted to a user selected one or more contact portals of the plurality of contact portals.

5. A method of social network updating, comprising:
providing the system of claim 1;

receiving contact information for the plurality of persons associated with the plurality of contact portals;

receiving the selected one or more messages from the user, the one or more messages being stored;

receiving a designation of the advocate from the user, the designation of the advocate granting access to the user profile upon the user's incapacitation;

receiving the health indication associated with the user from the advocate; and transmitting the health indication to the plurality of persons through the plurality of contact portals; and transmitting the one or more messages to one or more of the plurality of contact portals.

6. The method of claim 5, wherein the contact information includes one or more of a phone number, an email address, and a social media account.

7. The method of claim 5, wherein the plurality of contact portals include one or more of social media accounts, email address books, and contact information stored in a phone of the user.

8. The method of claim 5, further comprising:
receiving a designation of a private message from the user; and
transmitting the private message to a subset of the plurality of persons.

9. The method of claim 5, further comprising:
allowing the advocate to create, edit, and publish a social media account associated with the user.

10. The method of claim 5, further comprising:
allowing the advocate to provide an anniversary reminder to the plurality of persons.

11. The method of claim 5, further comprising:
providing access to a gift delivery service through the media platform.

12. The method of claim 5, further comprising:
providing information relating to funeral services and obituaries through the media platform.

* * * * *